Figure 1:
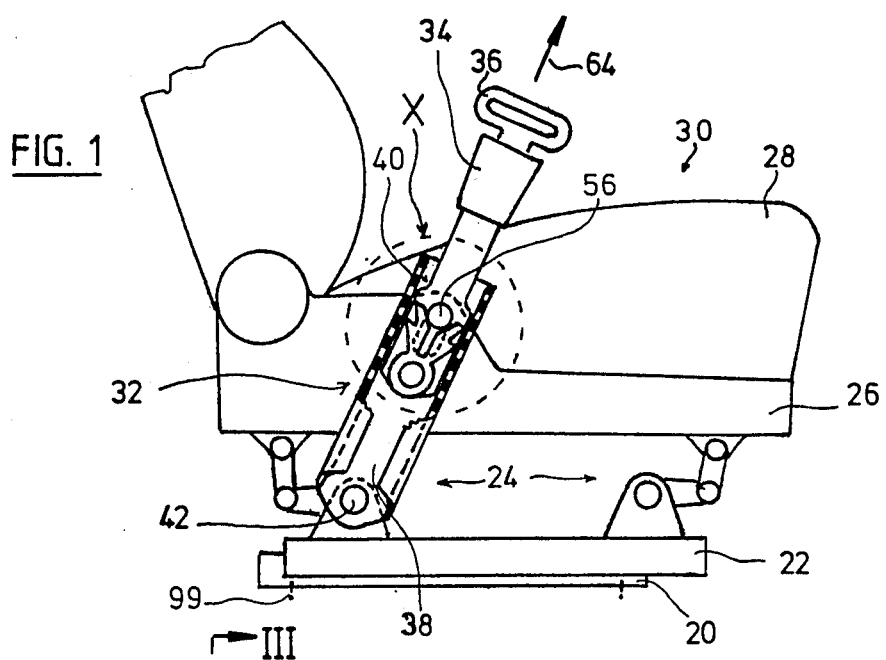

United States Patent [19]

Bauer et al.

[11] Patent Number: 4,790,597
[45] Date of Patent: Dec. 13, 1988

[54] VEHICLE SEAT WITH A LONGITUDINAL GUIDE, WITH AN ADJUSTMENT OF HEIGHT OR INCLINATION, AND WITH AN ATTACHMENT FOR SEAT BELT LOCK

[75] Inventors: Heinz Bauer; Burckhard Becker; Ernst-Reiner Frohnhaus; Alfred Gedig, all of Solingen; Josef Klink, Nagold; Antonin Koucky, Sindenfingen, all of Fed. Rep. of Germany

[73] Assignees: Firma C. Rob Hammerstein GmbH; Daimler-Benz AG, both of Fed. Rep. of Germany

[21] Appl. No.: 114,679

[22] Filed: Oct. 29, 1987

[30] Foreign Application Priority Data

Oct. 29, 1986 [DE] Fed. Rep. of Germany ... 8628855[U]

[51] Int. Cl.⁴ ............................................. A47C 31/00
[52] U.S. Cl. .................................. 297/468; 248/429; 297/473; 280/801
[58] Field of Search ............... 297/473, 468, 474, 480, 297/472; 248/429; 280/801

[56] References Cited

U.S. PATENT DOCUMENTS

| | | | |
|---|---|---|---|
| 3,292,744 | 12/1966 | Replogle | 297/479 X |
| 3,557,914 | 1/1971 | Tanaka | 297/479 X |
| 3,667,806 | 6/1972 | Sprecher | 297/479 |
| 4,239,260 | 12/1980 | Hollowell | 297/472 X |

FOREIGN PATENT DOCUMENTS 2802617 7/1979 Fed. Rep. of Germany ...... 297/473

Primary Examiner—James T. McCall
Attorney, Agent, or Firm—Steele, Gould & Fried

[57] ABSTRACT

A seatbelt lock is mounted to be movable as little as possible relative to the seat surface when the seat surface is adjusted in height or inclination. The seat has a longitudinal guide 20, 22, a device 24 for adjustment of height or inclination and a belt lock attachment 32. The lower end of the belt lock attachment 32 is affixed to the seat rail 22 of the longitudinal guide and carries a belt lock 34 at its upper end. The belt lock attachment has a lower part 38 linked to the seat rail and an upper part 40 linked to the seat carrier 26, the upper part being connected with the belt lock. One of these parts 38, 40 can move freely in a longitudinal guide formed by the other part. One part has at least one locking projection 60; and the other part has locking devices 46 interacting with the projection. By means of a safety piece 50, the two parts are held in a normal position permitting movement. When extreme forces induced during an accident act on the belt, the safety piece is overridden, whereby the locking projection engages in the locking device and removed of the upper part from the lower part is precluded.

13 Claims, 3 Drawing Sheets

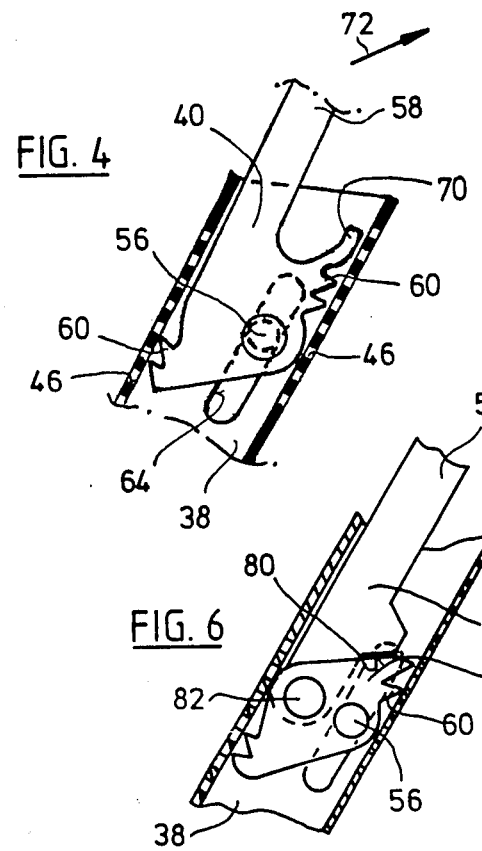
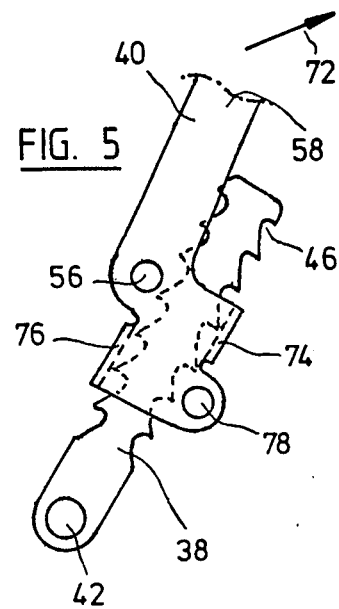
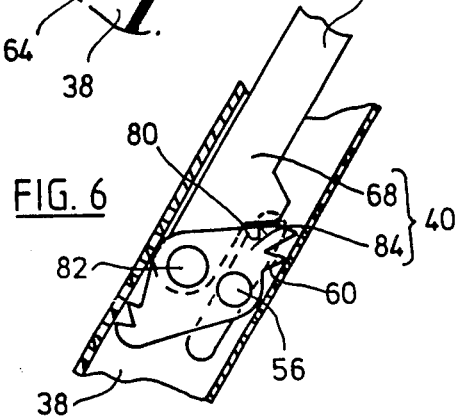
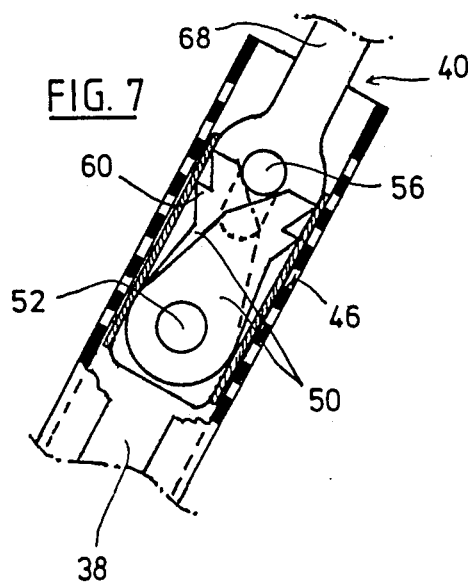
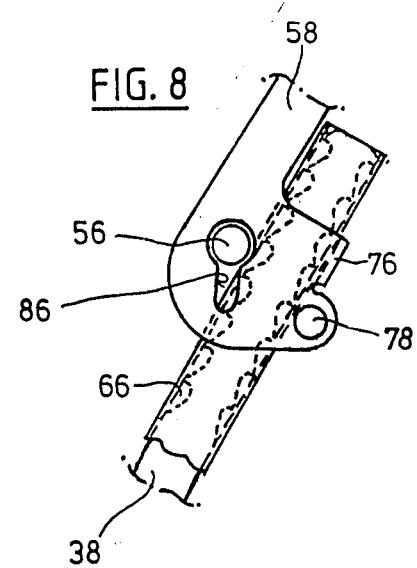

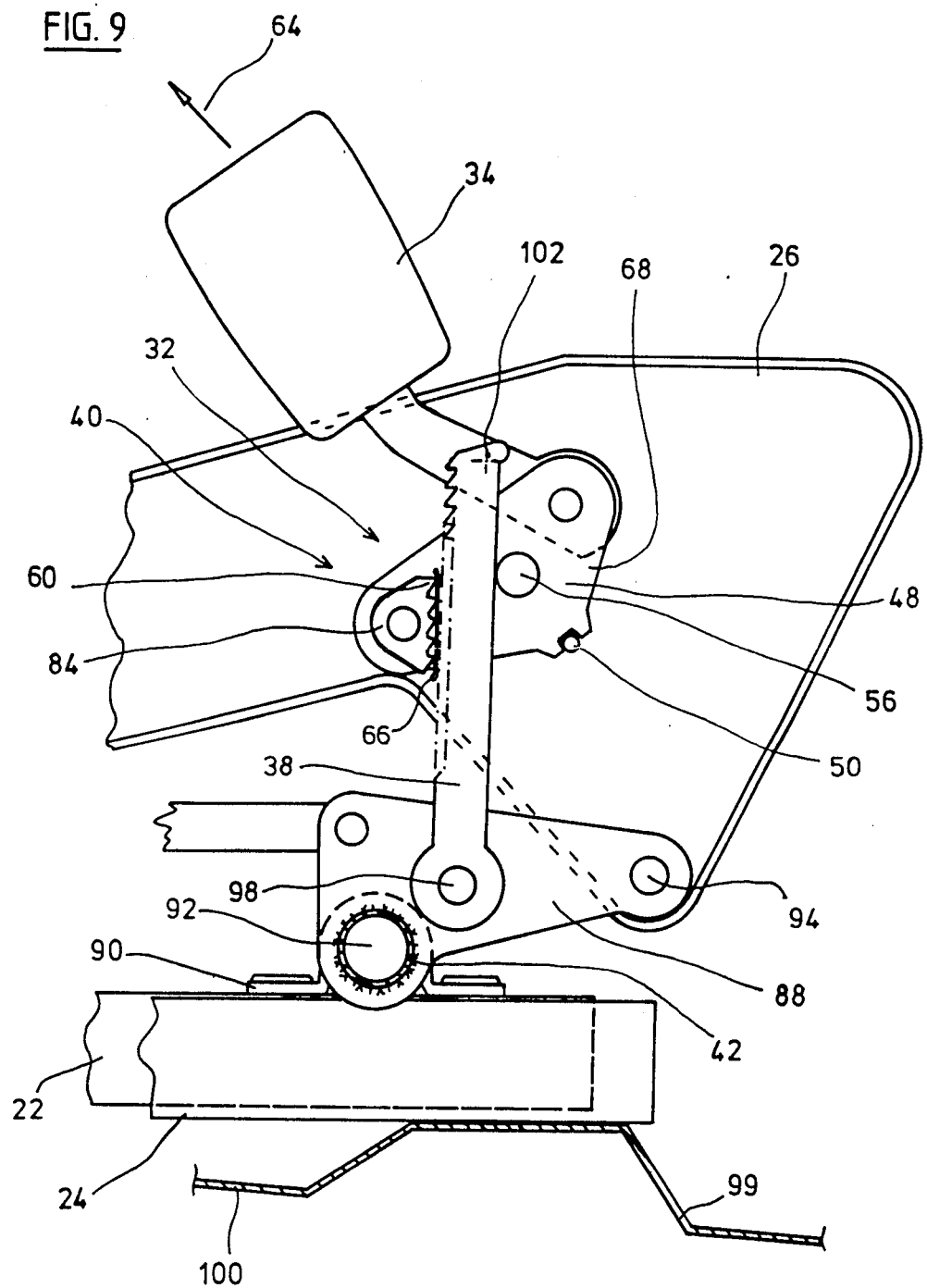

VEHICLE SEAT WITH A LONGITUDINAL GUIDE, WITH AN ADJUSTMENT OF HEIGHT OR INCLINATION, AND WITH AN ATTACHMENT FOR SEAT BELT LOCK

BACKGROUND OF THE INVENTION

The invention refers to a vehicle seat of the type
with a longitudinal guide consisting of at least one floor rail and one seat rail,
with a device for adjustment of the height or inclination of its seat surface, arranged between one seat carrier of the seat surface and the seat rail, and
with a belt attachment on the transmission hump side, whereby the lower end area thereof is fastened to the seat rail and the upper end area supports a seat lock which can accommodate the coupling piece of a safety belt and is located to the side of the seat surface.

If, in case of an accident, the body of a passenger is accelerated against the safety belt, the resulting forces can advantageously be intercepted, with low risk of injury to the passenger, if the belt, which may be designed as a V-belt, has an optimum position in relation to the body of the passenger, particularly to the pelvis. One should thus attempt to ensure that as far as possible, the belt lock has a constant position in relation to the seat surface. This must also be guaranteed when the position of the seat surface is adjusted and moved longitudinally in relation to the chassis. For purposes of constantly retaining the same position of the belt lock in relation to the seat position independently of the longitudinal displacement of the vehicle seat in relation to the chassis, i.e. the displacement between seat rail and floor rail, it is already known how to anchor the belt lock by means of a belt lock attachment on the seat rail, namely that seat rail which is located on the transmission hump side of the seat. In addition, one also attempts to locate the door side belt point on the seat carrier. This design presupposes longitudinal guides which are sufficiently well mounted and cannot be torn out. However, the relative changes caused by the adjustment of the height or inclination of the seat surface are not compensated for or taken into consideration. Rather, the position of the belt lock relative to the seat surface will change when the position of the latter changes due to adjustment of height or inclination. It is possible to compensate for these relative movements by using a flexible attachment for the belt lock, e.g. in the form of a steel wire. However, a belt lock of this nature does not ensure proper position of the belt lock relative to the seat surface. Consequently, a passenger buckling the seat belt must search for the belt lock; it is not always in the same relative position—particularly not after an adjustment of the seat surface. If the height or inclination of the seat surface is adjusted while the seat belt is buckled, the safety belt moves in the coupling piece and relative to the passenger.

Thus, the previously known vehicle seat is not ideal with respect to the position of the belt lock and the safety belt if the seat is adjusted. In case of an adjustment of the inclination or height of the seat surface, it is not possible to blindly reach the belt lock; rather, this will remain fixed in one position. An additional disadvantage is that the safety belt is displaced as a result of an adjustment movement.

It is currently known to reduce the influence of relative movements between seat carrier and floor group on the belt lock by linking a holding rail with stop notches to the floor group, particularly at the transmission hump of a passenger car. During normal seat adjustment movements, particularly a longitudinal displacement of the seat, the upper part, which carries the belt lock, slides on a sword-like part, whereby the two parts do not engage. In case of an accident-induced tensile force on the belt, the upper piece is angled, whereby it bends the sword and hooks into it. Hereby, the tensile forces are transmitted via the sword, which is installed at a slight inclination, from the belt lock into the floor group of the vehicle on the side of the transmission hump. This device is provided primarily to compensate for the longitudinal displacement of a seat, which is also the reason for the basically horizontal arrangement of the sword. In case of an additional seat adjustment, e.g. an adjustment of the height while in the extreme front and the extreme rear positions of the longitudinal guide, a constant position of the belt lock relative to the seat surface can only be achieved at very high costs.

SUMMARY OF THE INVENTION

Based on the previously known vehicle seat, the purpose of the invention is to further develop a vehicle seat of the type with a belt lock attachment on the seat rail so that the position of the belt lock during adjustments of the height or inclination of the seat surface follows the corresponding movements of the seat surface to the greatest extent possible and consequently retains the same distance to the seat carriers and, as far as possible, assumes a uniform angle position relative to the seat carrier.

On the basis of the vehicle seat of the initially mentioned type, this problem is solved thereby that the belt lock attachment consists of a lower part, which is linked to the seat rail or to a rocker connected thereto, and is connected with the belt lock, that one part can be freely moved in a longitudinal guide provided in the other part, that one part has at least one stop projection and the other part a stop notch interacting with it, and that the two parts are held in the normal position which allows a free movement, namely by means of a safety piece which can be elastically deformed or mechanically destroyed whereby, however, there is an override of the safety piece in case of accident-induced tensile force on the belt, in which case the stop projection engages in the stop notch and causes a blocking of any removal of the upper part in relation to the lower part.

Consequently, the invention shows how to attach the belt lock to the seat carrier and how to transfer accident-induced tensile forces on the belt into the seat rail by way of the belt lock attachment. The belt lock attachment is formed by two parts sliding against one another in such a manner that relative movements of the seat surface are compensated for during adjustments of height or inclination. Thereby, the invention shows how to link or to fix the belt lock over the upper part of the seat carrier in a torsion-proof manner, so that the position of the belt lock relative to the seat carrier remains to a great extent or completely constant. Under normal operation, the lower part is necessary only when the upper part is attached and only to the extent that it determines the angular position of the upper part and, consequently, of the belt lock. However, in case of an accident, its interaction with the upper part is most important, since it transfers the accident-induced tensile forces acting on the belt into the seat rail.

The device according to the invention retains the advantages of a belt lock attachment anchored to the seat rail: a movement of the vehicle seat relative to the floor group within the longitudinal guide does not change the position of the belt lock attachment and the belt lock.

By means of the belt lock attachment according to the invention, it is possible to achieve a better positioning of the belt lock than according to the state of the art. The belt lock attachment may be relatively small. It is triggered by accident-induced forces acting on the belt, either by a tensile force and/or by an overturning moment.

Preferably, the belt lock attachment is basically perpendicular to the rails of the longitudinal guide. This allows a relatively short displacement path between the upper part and the lower part. In addition, the structure can be relatively small, as mentioned previously. The belt lock attachment can be developed with low dead weight. Injuries due to relative movements of the two parts against one another or of the total belt lock attachment relative to the seat are practically eliminated, particularly if the belt lock attachment is sheathed.

In a further development of the invention, it is suggested that an end stop be provided in the guide of one part, establishing a maximum distance between the two parts. This prevents the disengagement of the two parts from one another if the accident-generated engagement between stop projection and locking device does not function or does not function sufficiently well, and it holds the two parts of the belt lock attachment captive.

In a particularly preferred execution, it is suggested that the upper arm of the belt lock attachment, which is linked to the seat carrier, be fixed against the seat carrier by means of the safety piece. According to the invention, the upper part is connected to the belt lock, which is thus directly affixed to the seat carrier and consequently follows its movements.

In a preferred execution of the invention, it is suggested that the seat carrier be linked to the seat rail via a rocker linked to the former and that the lower part of the belt lock attachment be linkage-connected in the vicinity of the linkage between seat rail and rocker.

Figure 2:
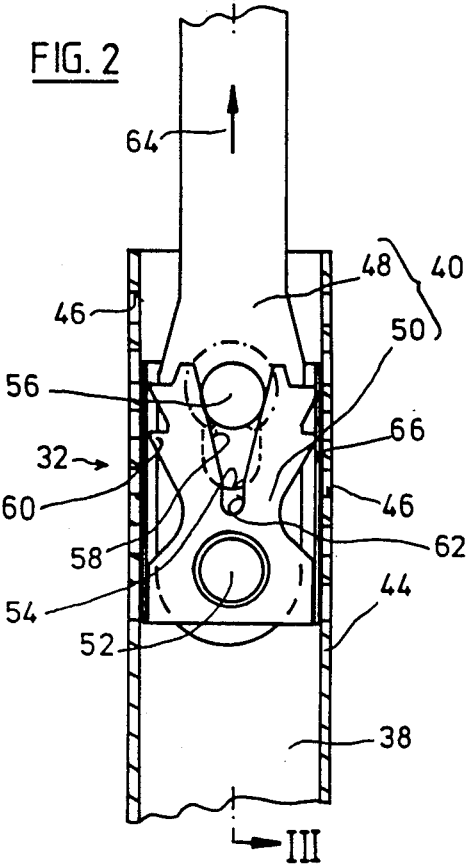
Figure 3:
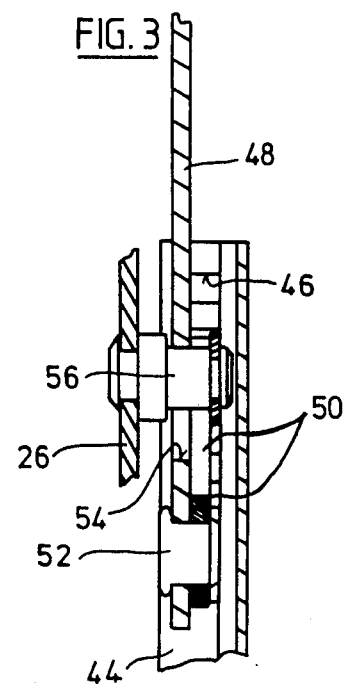

Additional advantages and characteristics of the invention can be seen from other claims as well as from the following description of several embodiments, which embodiments must not be considered limiting. These will be explained in greater detail with reference to the drawing. The drawing shows:

FIG. 1 A side view of a vehicle seat with a belt lock attachment according to the invention—shown oversize for the sake of clarity, FIG. 2 on a larger scale, that portion of the belt lock attachment which is located in the circle marked X, FIG. 3 a section along the line III—III in FIG. 2, FIG. 4 a representation similar to that in FIG. 2, of a second embodiment, FIG. 5 a representation of a third embodiment, FIG. 6 a representation of a fourth embodiment, FIG. 7 a representation of a fifty embodiment, FIG. 8 a representation of a sixty embodiments, each in side view, and FIG. 9 a side view of the rear portions of a vehicle seat.

The vehicle seat according to FIG. 1 is connected to a floor group—which is not shown—via a longitudinal guide consisting of a floor rail 20 and a seat rail 22. Above the seat rail 22, there is a device 24 for adjustment of height and inclination which is known per se and need not be discussed in detail here. It connects the seat rail 22 with a seat carrier 26 which, in combination with an upholstered body 28 and additional parts, e.g. springs, constitute the seat surface 30.

The lower end area of a belt lock attachment 32 is linked to the seat rail 22. In its upper end area, it has a belt lock 34, into which a coupling piece 36 of a V-shaped safety belt has been inserted to achieve a better illustration. In a known manner, the belt lock 34 is located to the side of the seat surface 30 of the vehicle seat, on the side of the [transmission] tunnel.

The belt lock attachment 32 is composed of a lower part 38 and an upper part 40, which can normally move freely against one another. In its lower end area, the lower part 38 is linked to the seat rail 22 via a transverse piece 42, which connects the two sides of the seat. Over the greater part of its total length, its shape is that of a C profile, but it can also, preferably, be designed as a closed, i.e. tubular profile. Stop notches 46 are provided in the side wall areas 44 thereof which face one another.

The upper part 40 is composed of a carrier part 48, to which the belt lock 34 is rigidly connected, and a safety piece 50, which are interconnected by means of a rivet 52. A longitudinal hole 54 is provided in the carrier portion and is penetrated by an axle journal attached to the seat carrier and providing a linkage connection between the upper part 40 and the seat carrier 26. The lower part 38, which forms the longitudinal guide, is provided with a longitudinal hole in the area of this axle journal, which hole also establishes the maximum movement range of the two parts 38, 40 when these are in the installed condition shown, and also guarantees that the upper part 40 can move freely against the lower part 38 within the guide formed in this manner.

The safety piece 50 has two inclined cheeks 58 which rest against the axle journal 56 and cause the axle journal to be located in the uppermost area of the longitudinal hole 54 in the illustrated normal position. In addition to the cheeks, there is a total of four locking projections 60 on the safety piece 50; these locking projections 60 correspond to locking notches 46 and can interact with these. However, in the normal position shown in the figure they are located within the guide and the locking notches 46 and thus do not influence the adjustment movement of the parts 38, 40. The guidance of the upper part 40 in the lower part 38 is achieved by the lower portion of the carrier part 48, which has long side surfaces resting against the inner wall of the guide. Between the two cheeks 58, there is a slot 62 in the flat safety piece 50.

Due to the axle journal 56, the upper part 40 is brought along when the seat carrier 26 is moved; thereby, it moves within the longitudinal guide formed by the lower part 38. The maximum displacement is a few centimeters, e.g. 6 to 7 cm.

The normal position is maintained with normal load on the safety belt and the resulting forces acting on the belt lock 34, i.e. normal passenger movements, body movements, etc. This normal position is only cancelled in case of accident-induced acceleration forces.

If an accident-induced force acts on the belt lock 34, as indicated by means of an arrow 64 in FIG. 1, a tensile force will act on the upper part 40, attempting to pull the latter out of the lower part 38. The result of this tensile force is that the safety piece 50 is pressed against the axle journal 56, whereby the inclined cheeks 58 bend the two arms of the safety piece 50 outwards and deform them plastically, which latter action is facilitated by the slot 62. The arms are bent so far outwards that the locking projections 60, which are provided on them, can engage in locking noches 46 in the lower part 38. From this moment, any further pull-out movement of the upper part 40 from the lower part 38 is blocked, and the tensile forces on the belt in the direction of the arrow 64 are now transferred via the carrier part 44 and the rivet 52 into the safety piece 50, the locking projections 60 of which are engaged in the locking notches 46, therefore the tensile forces acting on the belt are transferred into the lower part 38 and into the seat rail 22. The latter is engaged with the floor rail 20 so that it cannot be torn out, and by means of the two rails 20, 22, the tensile forces acting on the belt are ultimately transferred into the floor group.

It is characteristic for the function of this belt lock attachment that in normal operation, the upper part 40 is pulled along by the axle journal 56, whereby it can move freely within the guide formed by the lower part 38, that the axle journal 56 is utilized for the spreading of the safety piece 50, and that thereafter, the axle journal 56 is of practically no significance since the upper and lower parts 38, 40 form a rigid unit that cannot be torn out and which independently transfers the tensile forces from the axle journal 56.

The design of the described first embodiment is mirror-image symmetrical based on a symmetry line drawn through the two axle journals 42, 56. The release, i.e. the change from the illustrated normal position into the engaged or blocking position of the locking projections 60 in the locking notches 46 occurs almost exclusively by means of that proportion of the tensile force which acts on the belt at the belt lock.

Within the guided range, the carrier portion 48 and the safety piece 50 of the upper part 40 are surrounded by a sheathing 66 of a destructible material which facilitates the slide movement, e.g. a synthetic material, as shown in FIG. 2.

In the execution example illustrated in FIG. 4, the upper part 40 is designed as one piece. By contrast, the lower part 38 remains basically unchanged as compared to the execution example illustrated in FIGS. 1 through 3; however, the locking notches 46, which are executed as 'windows' in this case as well, are located at different levels. The longitudinal hole 64 is located on the other side of the center line of the lower part 38 and forms an upper area 58 of the upper part 40. The belt lock 34 is rigidly affixed in this area 58. In its lower area, the upper part 40 has two locking projections 60 on each outside edge, which projections are obliquely displaced in relation to one another. Above the right hand side locking projections 60 which face the area 58, to the right in the figure, i.e. located on the side opposite the area 58, there is a guide nose 70 which is executed in one piece and takes over the function of the safety piece 50. In normal operation, it has the position shown in FIG. 4 and prevents the locking projections 60 from engaging.

Finally, the lower area of the upper part 40 is linked to the axle journal 56 at the seat carrier 26.

In an accident-induced overturning moment around the axle journal 56 in the direction of the arrow 72, the guide nose 70 is first deformed, it is bent back. This enables the facing locking projections 60, which are located in its vicinity and obliquely displaced relative to one another, to engage in the corresponding locking notches 46, and the free movement of the parts 38, 40 against one another is blocked.

In the embodiment according to FIG. 5, the upper part 40, which is also designed as one piece, has two guide cheeks 74, 76, of which one, the guide cheek 74, is located on that side of the lower part 38 which is across from the axle journal 56, whereby the axle journal 56 and the guide cheek 74 are directly facing one another. The other guide cheek 76 is located on the same side of the lower part 38 as the axle journal 56, in the extension of an area 68 below the axle journal 56. The guide cheek 76 faces a locking pin 78. The guide cheek 74 assumes the function of the safety piece. The lower part 38 is a flat punched metal part and has a sawtooth-like profile on both sides which forms locking notches 46.

Similar to the function of the embodiment according to FIG. 4, a force in the direction of the arrow 72 as well as a pure tensile force in the longitudinal direction of the lower part 38 causes an overturning moment of the two parts 38, 40 against one another and around the axle journal 56. The latter, in turn, came closer to the left, toothed side of the lower part 38. Simultaneously, the guide cheek 74 is widened towards the outside and plastically deformed. This also enables the locking pin 78 to engage in the facing toothing of the lower part 38, so that the combined result is a blocking which secures the parts from being torn out.

The execution example according to FIG. 6 can be compared with the execution example according to FIG. 4; however, the upper part 40 is composed of two individual pieces which combine to produce a shape which, with the exception of the guide nose, approximately corresponds to the upper part 40 illustrated in FIG. 4. The area 68 is designed separately as an oblong part forming a stop nose 80. By means of a rivet 82, it is connected to a blocking part 84. The latter, which is linked to the axle journal 56, has the general shape of a parallellogram and is provided with locking projections 60 in the opposite corner area. Basically, the rivet 82 and the axle journal 56 are located to either side of the center line of the lower part 38, both at the same level. In the vicinity of the right hand locking projections 60, the blocking part 84 rests against the stop nose 80. The rigidity of the rivet connection created by the rivet 82 is selected so that under normal load, the blocking part 84 and the area 68 cannot move relative to one another, i.e. they behave as a single-piece part. Thus, the rivet connection assumes the function of the safety piece. As soon as an accident-induced tensile force acts on the area 68, the rivet 82 across from the axle journal 56 is torn upwards, whereby the blocking part 84 can assume a cross-wise position and engage. This engagement is also reinforced thereby that in case of an overturning moment of the area 68, the stop nose 80 also turns the blocking part 84 into an engaging position.

Basically, the embodiment according to FIG. 7 corresponds to the execution example illustrated in FIGS. 1 through 3; however, in this case the safety piece 50 consists of two individual arms linked at the rivet 52. Again, the rigidity of the rivet connection is selected so that the two arms of the safety piece 50 are not torn apart until subjected to accident-induced loads, whereby their locking projections 60 can engage with the locking notches 46. In an alternative execution (not shown), the two arms of the safety piece 50 are tensed against each other by means of a very strong spring; the spring force is not overcome and a shearing apart of the two arms of the safety piece 50 does not occur until accident-induced tensile forces act on the area 68.

The execution example according to FIG. 8 can be compared to the execution example according to FIG. 5; however, in this case a slot area extending the bearing opening in the axle journal 56 downwards will assume the function of the safety piece. The guide opening for the axle jorunal 56 faces a guide cheek 76 and a locking pin 78. The area 68 is laterally displaced in relation to the straight progression of the lower part 38, which is executed in a manner similar to the execution example illustrated in FIG. 5. In case of an accident-induced tensile force, there is an overturning moment, and the axle journal 56 is pressed into the narrower slot, whereby the slot 86 is widened and the surrounding material is plastically deformed. The result is a hook-up caused by the axle journal 56 and the locking pin 78. The slot 86 has approximately half the clear width of the guide opening of the axle journal 56 into which the slot opens while retaining its cross section.

In the execution example according to FIG. 9, the seat carrier is connected with the seat rail 22 by means of one rocker 88 (not two rockers as in FIG. 1). The rocker 88 is welded to the transversal piece 42, which is executed as a tubular part. The transversal piece 42 is hinged by means of a bearing block 90 on the upper side of the seat rail 22. This transversal piece 42 connects the two rockers 88 of the seat sides and forms a linkage point 92 between seat rail 22 and rocker 88. The linkage point 94 between the rocker 22 and the seat carrier 26 is located behind the linkage point 92 (in the direction of the seating), namely in the lowest position below the illustrated rear edge of the seat carrier 26 and in the highest position thereof at an angle of approx. 45° to the seat rail 22 above the linkage point 92. In the general area above the linkages 92, 94, the upper part 40 is linked by means of the axle journal 56 to the seat carrier 26, and it is additionally affixed to the seat carrier 26 by means of the safety piece 50, which is designed as a shearing nose. The belt lock 34 is attached to the upper part 40 on one side of the linkage point 56 in the area 68 of the part 48; on the other side, there is a linkage to a separate blocking part 84 which is provided with teeth 60 that are covered with a destructible casing 66. The lower part 38 runs between this block in part 84 and the axle journal 56; it, too, has teeth which constitute locking devices and can engage with the teeth 60 if, due to an accident, the shearing pin 50 is sheared as a result of a tension at the belt lock 34 causing a turning of the part 48.

The lower part 38 runs basically perpendicular to the rails 20, 22 and is linked to the rocker 88 at 98, in the vicinity of the linkage point 92. This linkage point 98 is located at about one third of the distance between the linkage points 92, 94, in the vicinity of the linkage point 92. In general, its position is selected so that the angle enclosing the lower part 38 with the seat carrier 26 is an independent as possible of the position between the seat carrier 26 and the seat rail 22 and as close as possible to a right angle. In other words, the linkage point 98 should carry out the same lateral movement (movement parallel to the rails 20, 22) as the seat carrier 26. Any remaining angular change of the lower part 38 in relation to the upper part 40 which cannot be compensated for, is assimilated by the play permitted by the guidance between the parts 56 and 84.

If the belt lock attachment 32 is blocked due to an accident, it will stiffen the linkage 94; the tensile force acting on the belt is transferred into the seat rail 22 via the rear portion of the rocker 88, the bearing block 90, and the transversal part 42. As shown in FIGS. 1 and 9, this transversal part 42 (resp. the linkage point 92) is located at a certain distance from the rear end of the seat rail 22. The seat rail 22 does not—as is common according to the state of the art—reach further backwards beyond the rear end area of the seat carrier 26. The rails 20, 22 are also shorter (than according to the state of the art), which improves the leg room for passengers in the rear seat. The floor rail 20 is connected with the floor group 100 by means of a rear consol 99. Independently of the displacement of the rails 20, 22 relative to one another, this consol 99 is always at the level of the transversal piece 42. This facilitates a favorable transfer of the tensile forces acting on the belt into and through the rails 20, 22. In the state of the art, the tensile forces acting on the belt are transmitted into the end area of the floor rails 20, which extends freely towards the rear.

The belt point on the door side is also directly attached to the seat carrier 26. It can be secured by means of a corresponding arrangement of the two parts 38, 40, or, a similar transmission of force generated in an accident can be omitted. The latter solution may be selected if the individual parts (26, 88 through 94) are sufficiently solid, since the tensile forces acting on the belt point on the door side are lesser than those at the belt lock 34. On the door side, the belt is then attached at point 102.

Finally, it should also be taken into consideration that the adjustment of height or inclination of parts, for example rail 24, also constitutes a device for adjustment and fixation. It facilitates the transmission of the tensile forces acting on the belt from the seat carrier 26 into the seat rail 22. For instance, if it affects the transversal part 42, it will to a certain extent hold the angular position and it also prevents a turning movement around the linkage point 92, whereby a portion of the transversal part 42 functions as a torsion rod. If the adjustment device is related to the linkage point 94, a significant portion of a tensile force acting on the belt can also be transmitted via this linkage 94 to the seat rail 24.

In the execution according to FIG. 9, the belt lock attachment is placed in a mechanically protected position. This reduces the danger of any damage to the parts 38, 40 which would prevent their function in case of an accident.

What is claimed is:
1. A vehicle seat, comprising:
   a longitudinal guide with at least one floor rail (20) and seat rail (22),
   a device (24) for adjustment of at least one of a height and an inclination of a seat surface (30) of the seat, located between a seat carrier (26) for the seat surface (30) and the seat rail (22),
   a seatbelt lock attachment on an inboard side of the seat, a lower end of the seatbelt lock attachment being fastened to the seat rail (22) and an upper end of the seatbelt lock attachment supporting a seatbelt lock (34), which can accommodate a coupling piece (36) of a safety belt and is movable to said inboard side of the seat,
   said seatbelt lock attachment (32) having a lower part (38) which is linked relative to the seat rail (22), and an upper part (40), which is linked relative to the seat carrier (26) and is connected with the seatbelt lock (34) such that one of the upper and lower parts can slide freely in a longitudinal guide defined by the other of said upper and lower parts, one of said upper and lower parts being provided with at least one stop projection and the other of said upper and lower parts having locking devices interacting with said stop projection, and further comprising a locking piece (50), holding the upper and lower parts (38, 40) in a normal position which permits their free sliding relative movement, and the locking piece (50) being overriden by a force affecting the safety belt during an accident, whereupon the stop projection (60) engages in the locking devices and relative movement of the upper part (40) and the lower part (38) is thereby prevented, and wherein said lower part (38) is linked relative to the seat rail (22) via a rocker (88), linked to the seat rail.

2. The vehicle seat of claim 1, wherein the seat carrier (26) is linked to the seat rail (22) by means of the rocker (88), and the lower part (38) is connected to the rocker (88) at a linkage point (98) adjacent a linkage (42) between the rocker (88) and the seat rail (22).

3. The vehicle seat of claim 1, wherein the floor rail (20) is connected to a floor group (100) in a rear attachment area, a transversal part (42) connecting the lower part to the seat rail always being located in at least one of in front of and above the rear attachment area with a change of seat position, and never behind the rear attachment area.

4. The vehicle seat of claim 1, wherein the upper part (40) is affixed to the seat carrier (26) by means of the locking piece (50) such that the upper part cannot be turned.

5. The vehicle seat of claim 1, wherein the lower part (38) is linked to said rocker (88), connected thereto by means of a connection disposed at a shortest possible distance from a transversal piece (42) connecting said lower part (38) and said seat rail (22).

6. The vehicle seat of claim 1, further comprising an upper end stopper for one of the upper and lower parts, said one of the upper and lower parts forming a guide part, the end stopper being provided in the other of said upper and lower parts forming a guiding part, the end stopper defining a limit for relative displacement of the upper and lower parts.

7. The vehicle seat of claim 1, wherein the locking piece (50) is defined by an area of the upper part (40) which can be deformed, the locking piece being a separate safety piece.

8. The vehicle seat of claim 1, wherein the belt lock attachment (32) is symmetrical around a center line running through a transversal piece (42) connecting the lower part to the seat rail, and through an axle journal (56) connecting the upper part to the seat carrier.

9. The vehicle seat of claim 1, wherein the upper part (40) includes a carrier part (48) which is connected to the seatbelt lock (34) and forms an area (68) with fixed connection to the seatbelt lock (34), and at least one additional part supporting the stop projections (60), the additional part and the seatbelt lock being interconnected by means of a linkage.

10. The vehicle seat of claim 1, wherein the stop projections (60) are surrounded by a sheathing (66) which promotes relative sliding movement of the upper and lower parts, the sheathing being destroyed in case of overload.

11. The vehicle seat of claim 1, wherein the lower part (38) runs substantially perpendicular to the floor rail (20) and the seat rail (22).

12. The vehicle seat of claim 1, wherein the safety piece defines an edge area of a slot that can be widened (86).

13. The vehicle seat of claim 1, wherein the safety piece includes a part having a rated break point.

* * * * *